United States Patent
Jöngren et al.

(10) Patent No.: US 9,667,378 B2
(45) Date of Patent: May 30, 2017

(54) MULTI-GRANULAR FEEDBACK REPORTING AND FEEDBACK PROCESSING FOR PRECODING IN TELECOMMUNICATIONS

(75) Inventors: George Jöngren, Stockholm (SE); Muhammad Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 388 days.

(21) Appl. No.: 12/817,476

(22) Filed: Jun. 17, 2010

(65) Prior Publication Data

US 2011/0080969 A1    Apr. 7, 2011

Related U.S. Application Data

(60) Provisional application No. 61/247,589, filed on Oct. 1, 2009.

(51) Int. Cl.

| | |
|---|---|
| *H04L 1/00* | (2006.01) |
| *H04B 7/0417* | (2017.01) |
| *H04B 7/06* | (2006.01) |
| *H04L 1/06* | (2006.01) |
| *H04B 7/04* | (2017.01) |

(52) U.S. Cl.
CPC ......... *H04L 1/0029* (2013.01); *H04B 7/0417* (2013.01); *H04B 7/0469* (2013.01); *H04B 7/065* (2013.01); *H04B 7/0634* (2013.01); *H04L 1/0693* (2013.01)

(58) Field of Classification Search
USPC ........................................ 375/267, 260, 257
See application file for complete search history.

(56) References Cited

U.S. PATENT DOCUMENTS

| | | | |
|---|---|---|---|
| 8,086,242 B2 | 12/2011 | Kent et al. | |
| 2008/0240274 A1* | 10/2008 | Han | H04B 7/0417 375/260 |
| 2009/0052405 A1* | 2/2009 | Ko et al. | 370/335 |

(Continued)

FOREIGN PATENT DOCUMENTS

| | | |
|---|---|---|
| EP | 2 019 496 A1 | 1/2009 |
| TW | 200904031 | 1/2009 |

(Continued)

OTHER PUBLICATIONS

International Search Report and Written Opinion mailed Feb. 24, 2011 in corresponding PCT Application No. PCT/IB2010/054424.

(Continued)

*Primary Examiner* — Wednel Cadeau
(74) *Attorney, Agent, or Firm* — Baker Botts, LLP

(57) ABSTRACT

A communications system comprises a second device (28) and a first device (30). The first device (30) is of a type which receives, on a downlink over a radio interface from a second device, precoded information (29). In an example mode the first device 28 generates a multi-part feedback signal (22) which is configured to affect content of a precoder matrix (40) utilized by the second device (28). On an uplink over the radio interface to the second device, at least two different parts of the multi-part feedback signal are transmitted with two respective different transmission granularities in time and/or frequency.

19 Claims, 12 Drawing Sheets

(56) References Cited

U.S. PATENT DOCUMENTS

| | | | |
|---|---|---|---|
| 2009/0059844 A1* | 3/2009 | Ko | H04B 7/0413 370/328 |
| 2009/0060060 A1* | 3/2009 | Stadelmeier et al. | 375/257 |
| 2009/0296844 A1* | 12/2009 | Ihm | H04B 7/0478 375/267 |
| 2010/0002801 A1 | 1/2010 | Jia et al. | |
| 2011/0205930 A1* | 8/2011 | Rahman et al. | 370/252 |

FOREIGN PATENT DOCUMENTS

| | | |
|---|---|---|
| WO | 2007/137280 A1 | 11/2007 |
| WO | 2009/002087 A1 | 12/2008 |
| WO | 2009/022820 A2 | 2/2009 |

OTHER PUBLICATIONS

Love et al, "Limited Feedback Unitary Precoding for Spatial Multiplexing System", IEEE Transactions on Information Theory, vol. 51, No. 8, Aug. 2005, pp. 2967-2976.

Dharamdial et al, "Efficient Feedback for Precoder Design in Single- and Multi-User MIMO Systems".

Simon et al, "Adaptive Feedback Reduction for Precoded Spatial Multiplexing MIMO Systems".

Phan et al, "Precoder Design for Space-Time Coded Systems Over Correlated Rayleigh Fading Channels Using Convex Optimization", IEEE Transactions on Signal Processing, vol. 57, No. 2, Feb. 2009, pp. 814-819.

Colman et al, "Limited Feedback Precoding in Realistic MIMO Channel Conditions", © 2007 Crown Copyright.

Bahrami et al, "Precoder Design Based on Correlation Matrices for MIMO Systems", ©2005 IEEE.

English translation of Chinese Office Action mailed Mar. 18, 2014 in Chinese application 201080054705.1.

Russian Official Action issued by the Federal Institute for Industrial Property (FIIP) for Application No. 2012117734/08(026786); (translation included) Nov. 24, 2014.

Search Report, ROC (Taiwan) Patent Application No. 099133404 dated Mar. 13, 2015 (Chinese with English translation).

ROC (Taiwan) Office Action of the Intellectual Property Office regarding Patent Application 099133404. Mar. 13, 2015.

Communication from EPO regarding Patent Application No. 15173576.8-1851 dated Sep. 24, 2015.

* cited by examiner

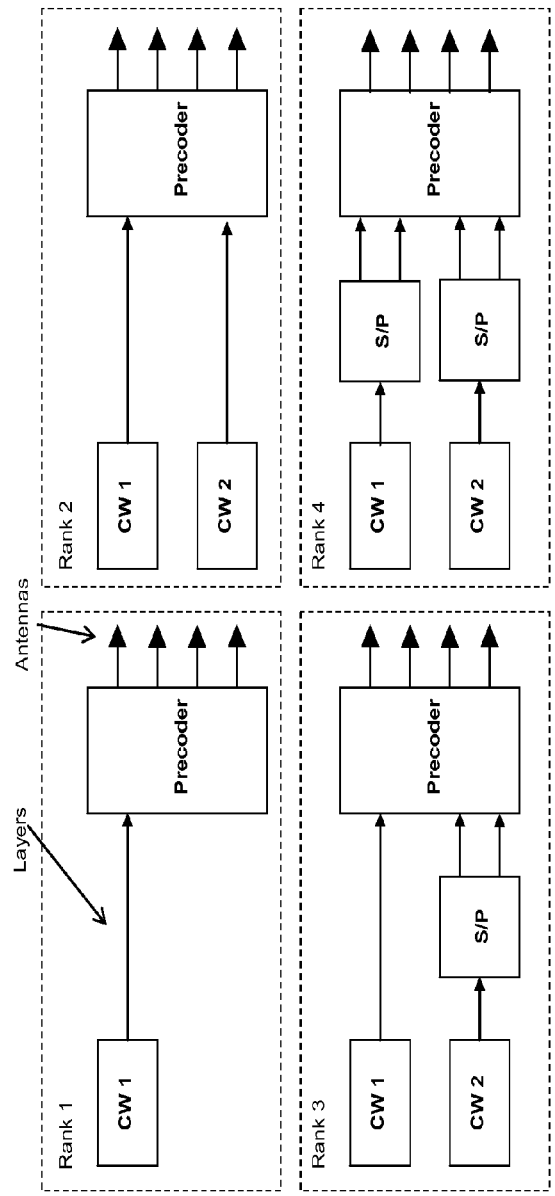
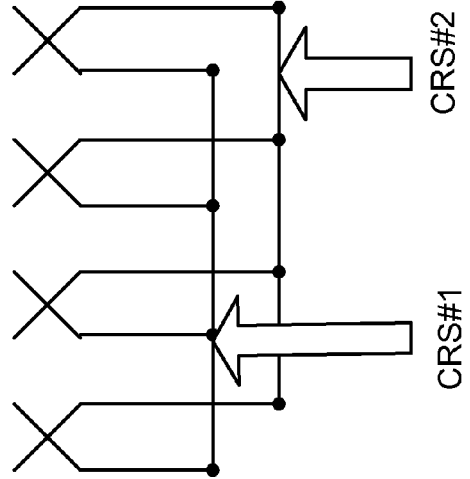
Fig. 2
Fig. 3

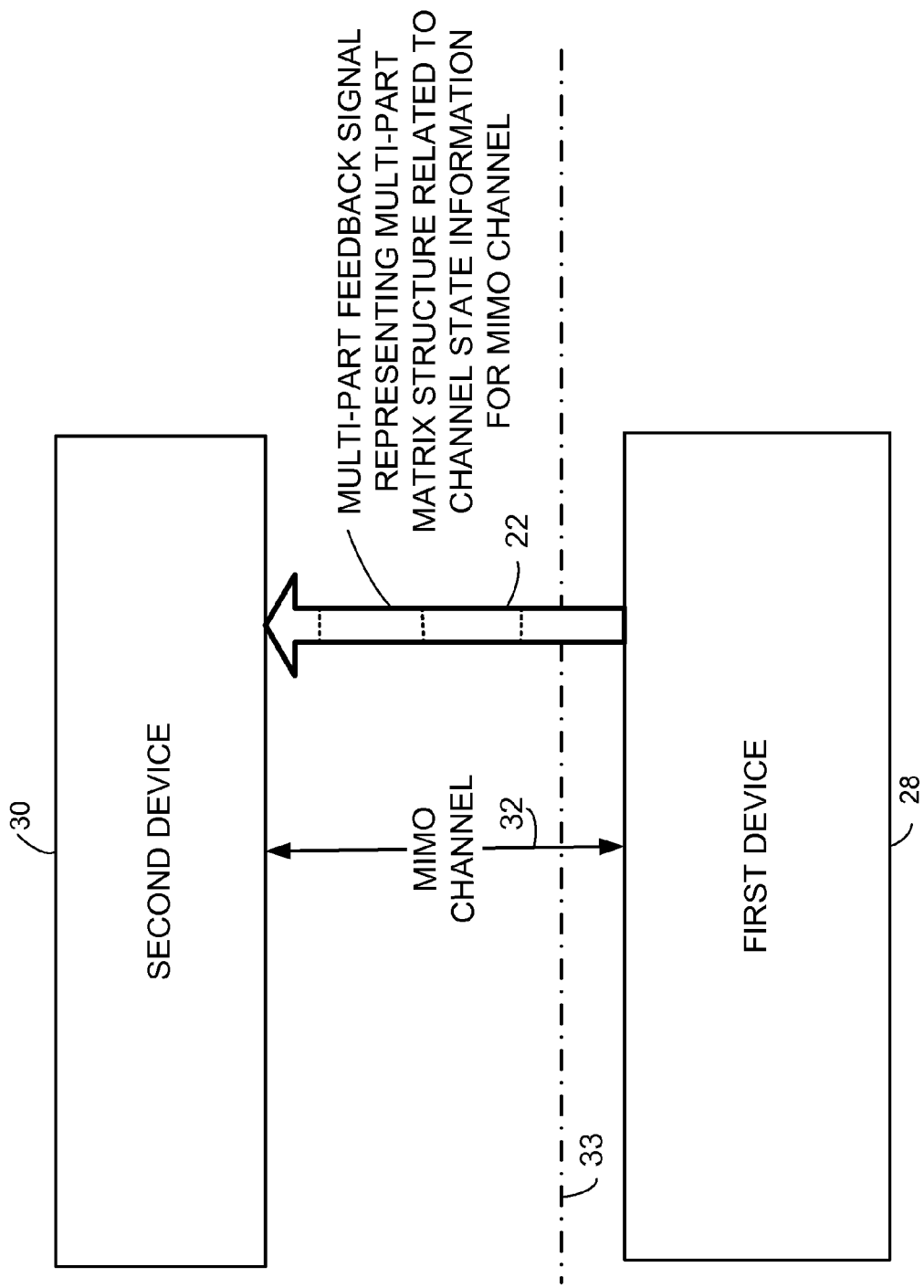

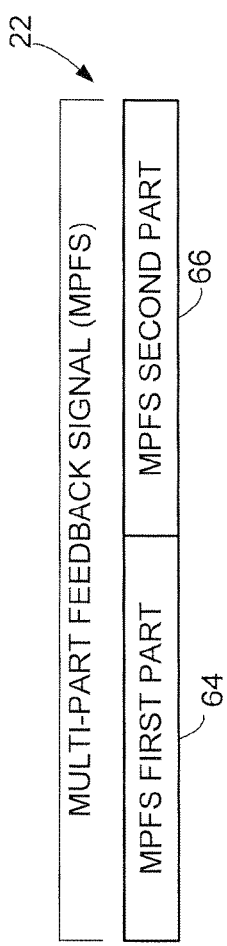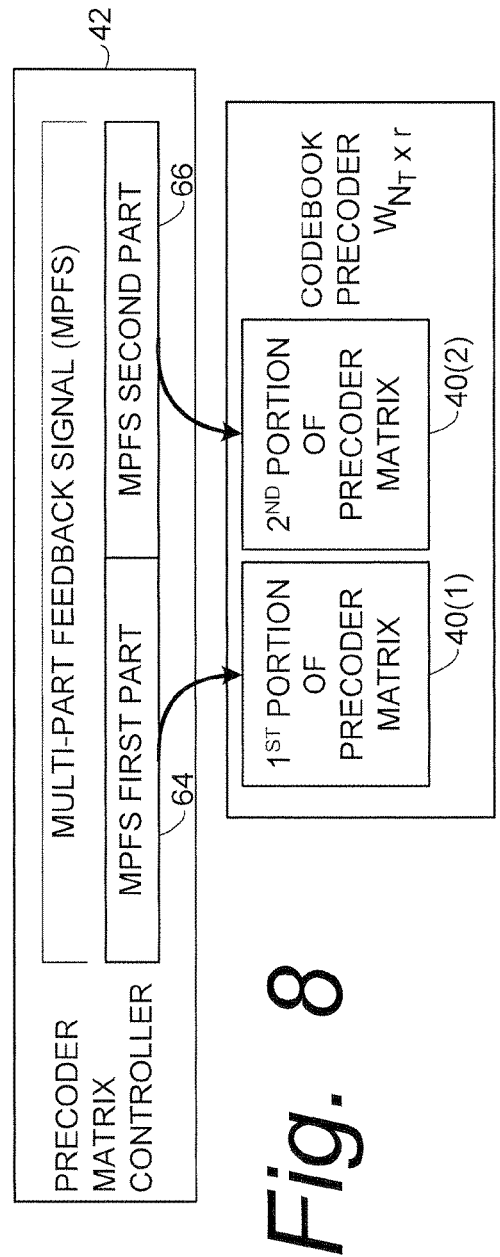

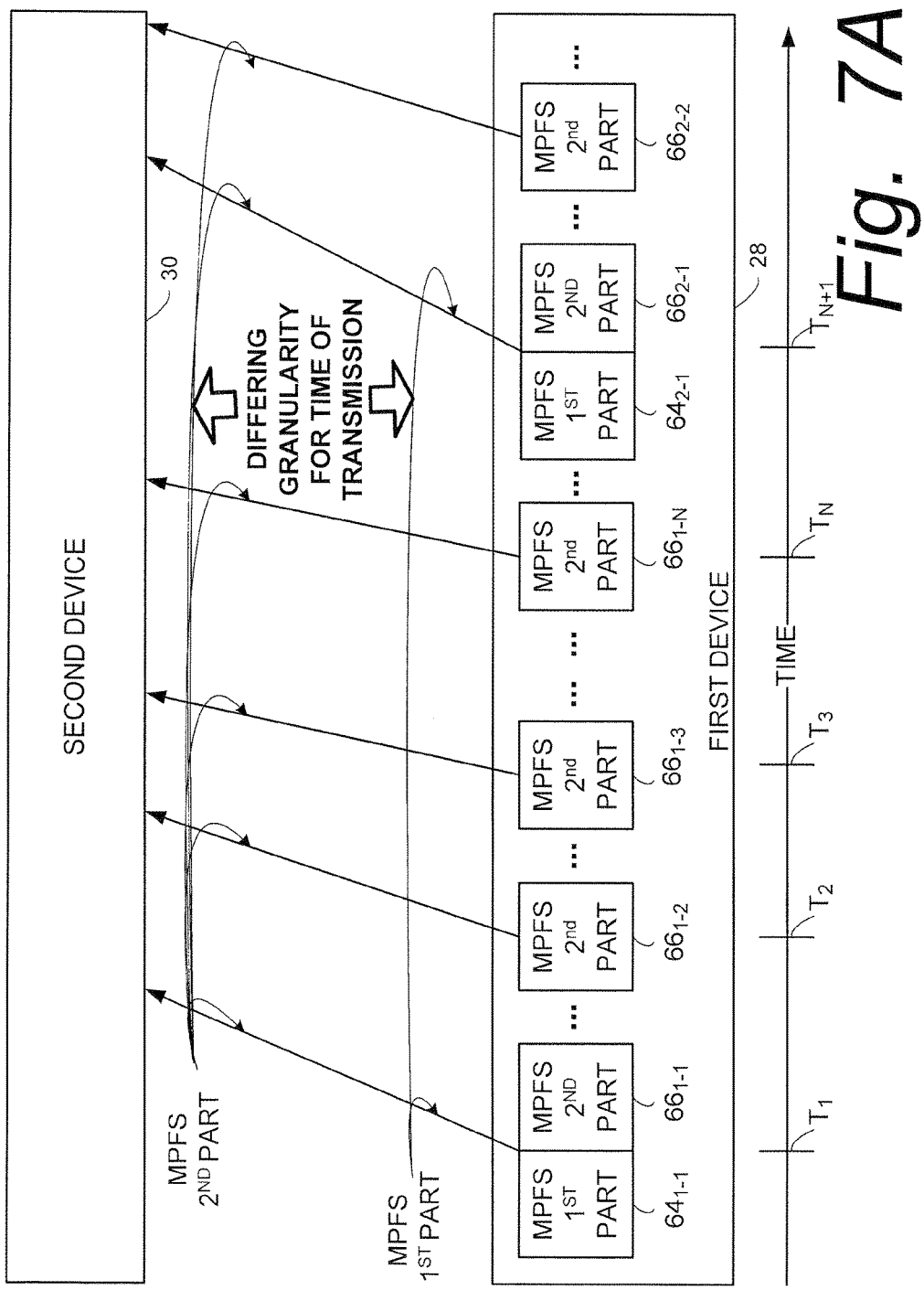

MULTI-GRANULAR FEEDBACK REPORTING AND FEEDBACK PROCESSING FOR PRECODING IN TELECOMMUNICATIONS

This application claims the priority and benefit of U.S. provisional Patent Application 61/247,589, filed Oct. 1, 2009, which is incorporated herein by reference in its entirety.

BACKGROUND

This technology pertains to feedback reporting and feedback processing for spatial multiplexing schemes found for example in radio communications.

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Wireless communication over channels having multiple transmit and multiple receive antennas has generated a great deal of interest over the last decade. Multiple-input and multiple-output (MIMO) is the use of multiple antennas at both transmitter and receiver to improve communication performance. Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel and such systems and/or related techniques are commonly referred to as MIMO.

A core component in the LTE standard is the support of MIMO antenna deployments and MIMO related techniques. One of the features in LTE Release-8 is the support of a spatial multiplexing scheme with possibly channel dependent precoding (see Love, D. J, Heath, R. W., Jr., "Limited feedback unitary precoding for spatial multiplexing systems", IEEE Transactions on Information Theory, vol. 51, issue 8, pp. 2967-2976, August 2005, the disclosure of which is incorporated herein by reference.) The spatial multiplexing scheme is targeted for high data rates in favorable channel conditions. An example illustration of the spatial multiplexing scheme is provided in FIG. 1.

As seen in FIG. 1, the information carrying symbol vectors s are multiplied by an $N_T \times r$ precoder matrix $W_{N_T \times r}$. The matrix is often chosen to match the characteristics of the $N_R \times N_T$ MIMO channel matrix H. Each of the r symbols in vector corresponds to a layer and r is referred to as the transmission rank. LTE uses orthogonal frequency division multiplexing (OFDM), and hence the received $N_R \times 1$ vector $y_k$ for a certain time-frequency resource element indexed k, assuming no inter-cell interference, is modeled by:

$$y_k = HW_{N_T \times r} s_k + e_k \qquad (1)$$

where $e_k$ is a noise vector obtained as realizations of a random process.

The precoder $W_{N_T \times r}$ may be selected from a predetermined and finite set of countable precoders known to both the eNodeB as well as the UE, a so-called codebook. This restricts the eNodeB in the choice of precoder and is usually coupled with feedback reporting from the UE which recommends a precoder to the eNodeB. Another alternative is to give the eNodeB complete freedom in determining the precoder, so-called non-codebook based precoding. By using dedicated pilots, also known as UE-specific reference signals (RS), the UE does not need to be aware of which precoder has been used in the transmission and, in contrast to codebook based precoding, there is no quantization effect. Combinations of codebook based and non-codebook based approaches are also possible. For example, the feedback reporting could be codebook based while the transmission is non-codebook based by the use of UE specific RS. The latter approach corresponds to current standardization efforts for Rel-10 of LTE.

As already mentioned, the UE may, based on channel measurements in the forward link, transmit recommendations to the base station of a suitable precoder to use, including recommended transmission rank. In the case of codebook based precoding, the UE may perform an exhaustive search over all precoders in the codebook to find the one which gives the best performance, e.g., predicted throughput, and then feed back an index pointing to the best precoder to the eNodeB. A single precoder that is supposed to cover a large bandwidth (wideband precoding) may be fed back. It may also be beneficial to match the frequency variations of the channel and instead feed back a frequency-selective precoding report, e.g., several precoders, one per subband.

Channel dependent precoding as above typically requires substantial signaling support, particularly for frequency-selective precoding. Not only is feedback signaling in the reverse link (i.e., from UE to eNodeB in LTE) needed, as mentioned previously, but typically also signaling in the forward link (i.e., from eNodeB to UE in LTE) is required to indicate which precoder was actually used in the forward link transmission since the forward link transmitter (i.e. eNodeB) might not be certain that it obtained a correct precoder report from the (forward link) receiver (i.e., UE).

The encoded bits originating from the same block of information bits are referred to as a "codeword". This is also the terminology used in LTE to describe the output from a single HARQ process serving a particular transport block and comprises turbo encoding, rate matching, interleaving, etc. The codeword is then modulated and distributed over the antennas. Such a transformed codeword is often also referred to as a "codeword" when there is no risk of confusion.

It may make sense to transmit data from several codewords at once, also known as multi-codeword transmission. The first (modulated) codeword may, for instance, be mapped to the first two antennas and the second codeword to the two remaining antennas in a four transmit antenna system. In the above context of precoding, the codewords are mapped to layers instead of direct mapping to the physical antennas.

In the field of high rate multi-antenna transmission, one of the most important characteristics of the channel conditions is the so-called channel rank. Roughly speaking, the channel rank can vary from one up to the minimum number of transmit and receive antennas. Taking a 4×2 system as an example, i.e., a system with four antennas at the transmitter side and two antennas in receiver side, the maximum channel rank is two. The channel rank varies in time as the fast fading alters the channel coefficients. Moreover, it determines how many layers, and ultimately also how many codewords, can be successfully transmitted simultaneously. Hence, if the channel rank is one at the instant of transmission of two codewords mapping to two separate layers, there is a strong likelihood that the two signals corresponding to the codewords will interfere so much that both of the codewords will be erroneously detected at the receiver.

In conjunction with precoding, adapting the transmission to the channel rank involves using as many layers as the channel rank. In the simplest of cases, each layer would correspond to a particular antenna. But the number of codewords may differ from the number of layers, as in LTE. The issue then arises of how to map the codewords to the layers. Taking the current working assumption for the 4 transmit antenna case in LTE as an example, the maximum number of codewords is limited to two while up to four layers can be transmitted. A fixed rank dependent mapping according to FIG. 2 is used.

The design and relative placement of the antennas has a strong impact on the performance of the system. There are naturally many different possibilities. A natural constraint is to keep the total array size as small as possible while maintaining good performance. Co-polarized, closely spaced antennas tend to result in correlated fading, which simplifies achieving array gain via beamforming, but on the other hand reduces the chance of enjoying high rank transmissions that tend to prefer uncorrelated fading.

Another way of obtaining uncorrelated fading, and in fact also limit the interference between layers while keeping the size of the antenna array small, is to transmit on orthogonal polarizations by using a co-located and cross-polarized pair of antennas. FIG. 3 illustrates, by vertical lines, eight antennas, the two cross-polarized antennas of a pair being commonly illustrated by an "X" to account for the ±45 degree orientations of the polarizations. A combination of orthogonal and closely spaced antennas is a promising array setup for 4 and 8 transmit cases. As also depicted in FIG. 3, by using pairs of cross-polarized antennas close to each (in the order of 0.5-1 wavelengths), the size of the array is kept small while at least up to rank 2 transmissions is well gathered for by means of transmission on orthogonal polarizations while achieving array gain is facilitated by the small distance between the cross-poles.

In the particular example of FIG. 3 two Common Reference Signals (CRSs), e.g., CRS#1 and CRS#2, can be used for orthogonal polarizations so that channel estimation is facilitated at forward link receiver. But reference signals can, if available, of course also be mapped in other ways on to the antenna array. For example, if eight reference signals are available, they can each be connected to a separate antenna. In Rel-10 of LTE, this may be a common scenario since there will then be support of up to eight cell-specific antenna ports and their corresponding reference signals.

In case of conventional precoder feedback, the size of the codebook directly determines the amount of signaling overhead. It is therefore desirable to strive for as small codebook as possible. On the other hand, a small codebook usually implies lower performance. This problem becomes more pronounced as the number of transmit antennas increases due to the need of a larger codebook to cover the increase in number of degrees of freedom that can be exploited for transmission. The overhead is particularly large when frequency-selective precoding is employed and thus multiple precoders covering the bandwidth are fed back. Such kind of precoding is typically required to track the fading across frequency in order to ensure the transmitted signals add constructively on the receiver side and also orthogonalize the channel for good separation of the layers.

A consequence of a large codebook and/or frequency-selective precoding is also high computational complexity for the selection of precoder, which is carried out on the UE side for precoder feedback to be used for downlink transmissions or on the eNodeB side in case of precoded transmissions from UEs in the uplink or in case of non-codebook based precoding. There is a substantial and increasing amount of number crunching involved as the precoder matrices grow larger.

A codebook or precoder determination procedure may also perform poorly for a particular antenna array setup. Matching the properties of the precoder to the particular antenna setup is therefore important as it can maintain high performance while at the same time reduce the overhead. To increase the benefits of multi-rank transmission and reduce the requirements on the need of advanced receivers, orthogonalization of the channel plays a crucial role. However, with normal codebook based precoding as in present Release-8 LTE, the orthogonalization effect is almost negligible due to too few precoders in rank 2 for 2 Tx transmission and in rank 2, 3 and 4 for 4 Tx transmission. At the time, this was considered appropriate in order to maintain reasonable overhead numbers.

SUMMARY

The technology disclosed herein mitigates problems such as those described above by introducing a structure in the precoder matrices where different parts of the structure can be updated at different frequency and/or time granularities based on feedback corresponding to the different mentioned parts. In case of codebook based precoding, the feedback signaling may directly correspond to different parts of the precoder. Similar such multi-granular signaling may also be applied to a potential forward link signaling to a first device, e.g., to the wireless terminal or wireless terminal (UE).

In one of its aspects the technology disclosed herein concerns a method of operating a first device which reports feedback information to a second device. The first device is of a type that receives information that has been precoded at the second device prior to transmission from the second device over a multiple-input, multiple output (MIMO) channel to the first device. In example embodiments and modes the method comprises generating a multi-part feedback signal representing a multi-part matrix structure which is related to channel state information for the channel; and transmitting to the second device at least two different parts of the multi-part feedback signal with two respective different transmission granularities in time and/or frequency.

In another of its aspects the technology disclosed herein concerns a method of operating a communications network which comprises a first device and a second device. In example embodiments and modes the method comprises transmitting information that has been precoded at the second device over a multiple output (MIMO) channel to the first device; at the first device, generating a multi-part feedback signal representing a multi-part matrix structure which is related to channel state information for the channel; the first device transmitting to the second device at least two different parts of the multi-part feedback signal with two respective different transmission granularities in time and/or frequency; and using the multi-part feedback signal at the second device to affect precoding of information transmitted over the channel to the first device.

In another of its aspects the technology disclosed herein concerns a method of operating a communications node. In example embodiments and modes the method comprises using a precoder to transform information that is transmitted over a multiple-input, multiple output (MIMO) channel to the recipient device; receiving a multi-part feedback signal from the recipient device, the feedback signal representing a multi-part matrix structure related to channel state information for the channel, at least two different parts of the multi-part feedback signal being received with two respective different transmission granularities in time and/or frequency; using the multi-part feedback signal at the second device to affect precoding of further information transmitted over the channel to the recipient device. In an example implementation, the method further comprises sending a feedback format command to a recipient device, the format command being configured to specify the respective different transmission granularities.

According to example embodiments or modes or implementations of one or more of the methods disclosed herein, the different parts of the multi-part feedback signal correspond to different matrices. The multi-part matrix structure includes at least the constituent matrices.

According to example embodiments or modes or implementations of one or more of the methods disclosed herein, the multi-part matrix structure comprises a precoder matrix structure for a precoder which is derived from the channel state information. As a non-limiting example implementation, at least one part of the multi-part matrix structure is part of or represents at least a portion of a codebook. In some such implementations the precoder matrix can be obtained as a Kronecker product of two matrices comprising the multi-part matrix structure, e.g., a Kronecker product of a polarization matrix and a beamforming vector. For example, the matrix utilized by the second device for transmission rank r and NT transmit antennas can be represented as a Kronecker product $W^{(r)} = W_{pol}^{(r)} \otimes w_{BF}$ wherein a 2×r polarization precoder matrix $W_{pol}^{(r)}$ adjusts the relative phases between two orthogonal polarizations while a $$\frac{N_T}{2} \times 1$$

beamforming vector $w_{BF}$ adjusts the relative phases within each of two groups of closely spaced co-polarized antennas.

According to example embodiments or modes or implementations of one or more of the methods disclosed herein, the multi-part matrix structure comprises a channel correlation matrix. In some example implementations, the channel correlation matrix comprises a block diagonal matrix and a first constituent matrix of the channel correlation matrix represents at least one block, and a second constituent matrix of the channel correlation matrix represents relative phases and amplitude of the blocks.

In one of its aspects the technology disclosed herein concerns a device which reports feedback information to a second device using a multi-part feedback signal representing a multi-part matrix structure which is related to channel state information for a multiple-input, multiple output (MIMO) channel, with at least two different parts of the multi-part feedback signal being transmitted to the second device with two respective different transmission granularities in time and/or frequency. In an example embodiment and implementation, the first device comprises a receiver configured to receive information that has been precoded at the second device prior to transmission from the second device over the channel to the first device; a generator configured to generate the multi-part feedback signal; and a transmitter which transmits to the second device the at least two different parts of the multi-part feedback signal with the two respective different transmission granularities in time and/or frequency.

In another of its aspects the technology disclosed herein concerns a communications network which comprises a first device and a second device. The first device is configured to report feedback information to a second device using a multi-part feedback signal representing a multi-part matrix structure which is related to channel state information for a multiple-input, multiple output (MIMO) channel, with at least two different parts of the multi-part feedback signal being transmitted to the second device with two respective different transmission granularities in time and/or frequency. The second device is configured to use the multi-part feedback signal to affect precoding of further information transmitted over the channel to the first device. In an example embodiment and implementation, the second device comprises a precoder configured to transform information that is to be transmitted to the second device; and, a second device transmitter which transmits precoded information over the channel to the first device. The first device comprises a receiver configured to receive the precoded information over the channel from the first device; a generator configured to generate the multi-part feedback signal; and a first device transmitter which transmits to the second device the at least two different parts of the multi-part feedback signal with the two respective different transmission granularities in time and/or frequency. The second device further comprises a precoder controller configured to use the multi-part feedback signal to affect precoding of further information transmitted over the channel to the first device.

In another of its aspects the technology disclosed herein concerns a communications node which receives a multi-part feedback signal from a recipient device. The feedback signal represents a multi-part matrix structure related to channel state information for a multiple-input, multiple output (MIMO) channel over which the node transmits precoded information to the recipient device. At least two different parts of the multi-part feedback signal being received with two respective different transmission granularities in time and/or frequency. The node uses the multi-part feedback signal to affect precoding of further information transmitted over the channel to the recipient device. In an example embodiment and implementation, the node comprises a precoder configured to transform information that is transmitted over the channel to the recipient device; a receiver which receives the multi-part feedback signal; and, a precoder controller configured to use the multi-part feedback signal at the second device to affect precoding of further information transmitted over the channel to the recipient device. In an example embodiment, the precoder controller is further configured to generate a feedback format command to the recipient device, the format command being configured to specify the respective different transmission granularities In one or more of the embodiments described herein the multi-part matrix structure comprises a precoder matrix structure for a precoder which is derived from the channel state information. In one or more of the embodiments described herein at least one part of the multi-part matrix structure is part of or represents at least a portion of a codebook. In some such implementations the precoder matrix can be obtained as a Kronecker product of two matrices comprising the multi-part matrix structure, e.g., a Kronecker product of a polarization matrix and a beamforming vector. For example, the matrix utilized by the second device for transmission rank r and NT transmit antennas can be represented as a Kronecker product $W^{(r)} = W_{pol}^{(r)} \otimes w_{BF}$ wherein a 2×r polarization precoder matrix $W_{pol}^{(r)}$ adjusts the relative phases between two orthogonal polarizations while a $$\frac{N_T}{2} \times 1$$

beamforming vector $w_{BF}$ adjusts the relative phases within each of two groups of closely spaced co-polarized antennas.

In one or more of the embodiments described herein the multi-part matrix structure comprises a channel correlation matrix. In some example implementations, the channel correlation matrix comprises a block diagonal matrix and a first constituent matrix of the channel correlation matrix represents at least one block, and a second constituent matrix of the channel correlation matrix represents relative phases and amplitude of the blocks.

In certain embodiments and modes, the first device is a wireless terminal and the second device is a base station node. In another example embodiment and mode, the first device and the second device are wireless terminals which are in communication (e.g., ad-hoc short range communication) with each other.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view showing codeword to layer mapping for a four antenna system with precoding.

FIG. 3 is a diagrammatic view illustrating a cross-polarized antenna setup for an example of eight transmit antennas.

FIG. 4A is a schematic view of a communications system showing transmission of a multi-part feedback signal from a first device to a second device.

FIG. 5 is a diagrammatic view showing an example format of a multi-part feedback signal according to an example embodiment.

FIG. 7A is a diagrammatic view illustrating an example scenario of differing granularity for time transmission of differing portions of the multi-part feedback signal.

FIG. 8 is a diagrammatic view illustrating use of a generic multi-part feedback signal for affecting content of two differing portions of a precoder matrix.

DETAILED DESCRIPTION

Figure 1:
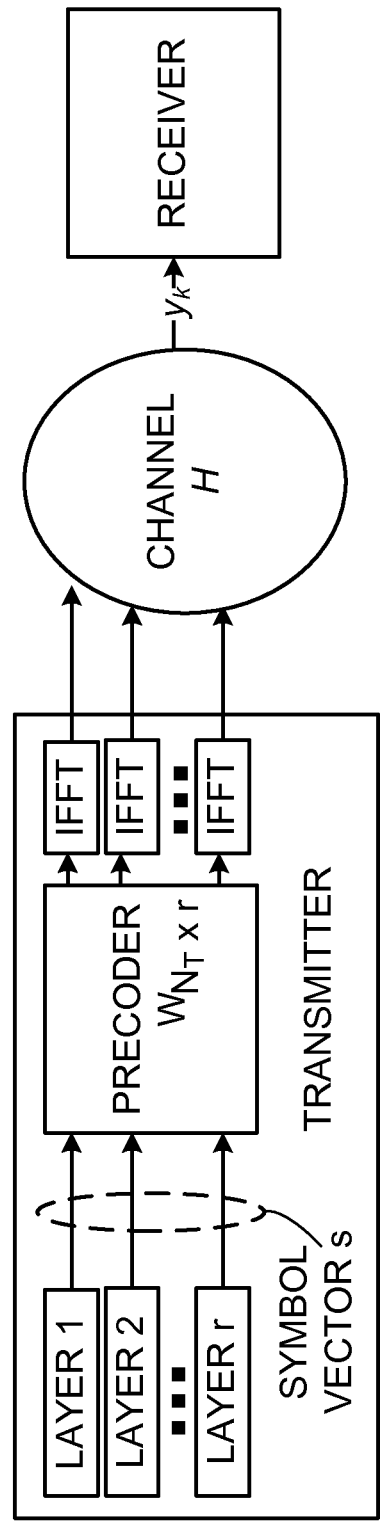
FIG. 1 is a schematic view of transmission structure of a precoded spatial multiplexing scheme in Long Term Evolution (LTE).

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 4A shows a representative communications system 20 and transmission of a multi-part feedback signal 22 from first device 28 to second device 30. The second device 30 transmits precoded information 29 to first device 28 over MIMO channel 32. The MIMO channel 32 exists over a radio interface 33. The second device 30 receives from the first device 28 a multi-part feedback signal (MPFS) 22. The multi-part feedback signal (MPFS) 22 represents a multi-part matrix structure. In example embodiments each part in the multi-part feedback signal 22 has a direct one-to-one correspondence with each part in the multi-part matrix structure. The multi-part matrix structure is related to channel state information (CSI) for the MIMO channel 32. As explained herein, differing parts of the multi-part feedback signal 22 are transmitted from first device 28 to the second device 30 with respective different granularity in time and/or frequency.

Figure 4B:
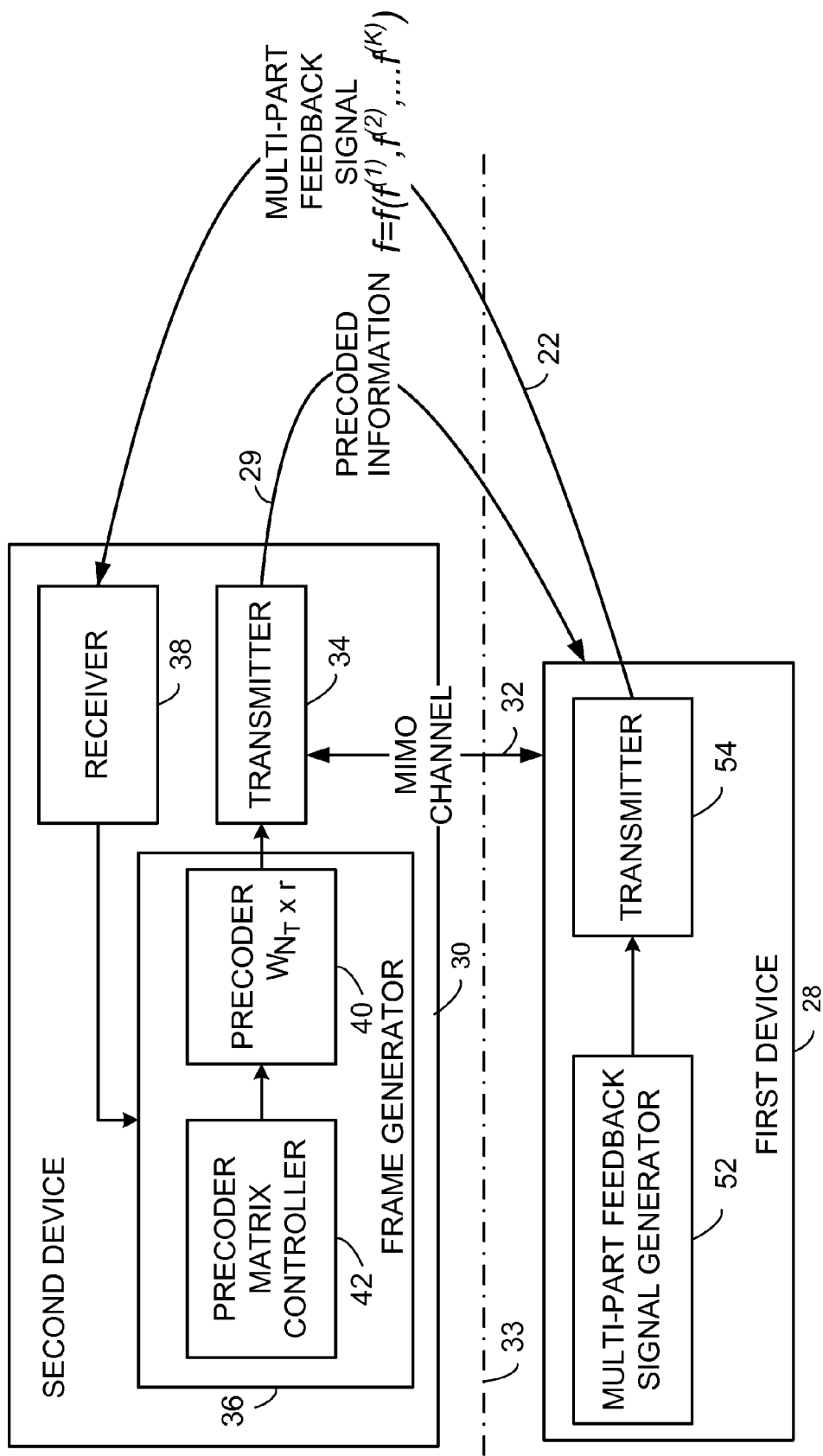
FIG. 4B is a schematic view of a communications system showing in more detail selected components of first device and a second device wherein the first device transmits a multi-part feedback signal to the second device.

FIG. 4B shows certain aspects of first device 28 and second device 30 in more detail according to example, non-limiting embodiment. The second device 30 transmits precoded information 29 to first device 28 over MIMO channel 32. Second device 30 comprises transmitter 34; frame generator 36; and receiver 38. The frame generator 36 comprises precoder 40 and precoder matrix controller 42. The receiver 38 is configured to receive from the first device a multi-part feedback signal (MPFS) 22. The multi-part feedback signal (MPFS) 22 represents a multi-part matrix structure which is related to channel state information for the MIMO channel 32. Differing parts of the multi-part feedback signal 22 are transmitted from first device 28 to the second device 30 with respective different granularity in time and/or frequency. Precoder matrix controller 42 is configured to use the multi-part feedback signal 22 to affect content of a precoder matrix utilized by precoder 40.

As further shown in FIG. 4B, first device 28 receives, on a downlink over channel 32 from second device 30, the precoded information 29. In the example embodiment of FIG. 4B, the first device 28 comprises multi-part feedback signal generator 52 and transmitter 54. The multi-part feedback signal generator 52 is configured to generate the multi-part feedback signal 22. As indicated above, the multi-part feedback signal (MPFS) 22 represents a multi-part matrix structure which is related to channel state information for the MIMO channel 32 and is configured to affect content of precoder matrix 40 utilized by the second device 30. The multi-part feedback signal 22 comprises at least two different parts configured to be transmitted with two respective different transmission granularities in time and/or frequency. Transmitter 54 is configured to transmit the multi-part feedback signal 22 on an uplink over channel 32 to second device 30 with the at least two different parts of the multi-part feedback signal 22 being transmitted with the two respective different transmission granularities.

In an example, non-limiting embodiment, first device 28 can take the form of a wireless terminal (e.g., wireless terminal (UE)) and second device 30 can take the form of a base station node. In other embodiments the first device 28 and second device 30 can take other forms. For example, the first device can take the form of a base station node and the second device can take the form of a wireless terminal. As another example the first device and the second device can be two wireless terminals in ad-hoc short range communication mode.

As indicated above, multi-part feedback signal (MPFS) 22 represents a multi-part matrix structure which is related to channel state information (CSI) for the MIMO channel 32. The multi-part matrix structure comprises multiple, e.g., at least two, constituent matrices. Thus, multi-part feedback signal 22 comprises at least two different parts.

A simplified two-part multi-part feedback signal 22 is shown in FIG. 5. The multi-part feedback signal 22 of FIG. 5 is shown as comprising first part 64 of multi-part feedback signal (MPFS) and second part 66 of multi-part feedback signal (MPFS). It should be understood that the number of parts of multi-part feedback signal 22 can be greater than two. The different parts of the multi-part feedback signal 22 may be based on different or separate reports/determinations made by first device 28.

Since the multi-part matrix structure is related to channel state information (CSI) for the MIMO channel 32, at least one and possibly more of the parts thereof represent a matrix which is related to the channel state information. For example, with reference to the example of FIG. 5, both first part 64 and second part 66 may comprise matrices related to the channel state information. Alternatively, one of the first part 64 and the second part 66 may comprise a matrix while the other can comprise information pertaining to the channel in another form, e.g., an index or other indicator that refers, points to, or represents a constituent matrix of the multi-part matrix structure, the constituent matrix itself being related to the channel state information. Thus, the multi-part feedback signal 22 "representing" matrix(ices) as used herein encompasses or comprise the multi-part feedback signal 22 actually being comprised of matrix(ices) or the index or other indicator which refers, points to, or represents a constituent matrix of the multi-part matrix structure. As such, as used herein "multi-part matrix structure" encompasses a structure comprising at least two matrices. The term "matrix" can encompass a vector, but not a scalar. Thus, for example, a multi-part matrix structure can comprise a first part which is formed by one or more matrices and a second part which is formed by one or more other matrices. As another example, a multi-part matrix structure can comprise a first part which is formed by one or more matrices and a second part which is formed by a matrix which is a vector.

Being "related to channel state information" as used herein can encompass or comprise one or more parts of the multi-part feedback signal (MPFS) 22 actually comprising channel state information or comprising actual precoder matrix(ices) which the first device 28 has derived from the channel state information. Moreover, "channel state information" can include or be expressed by, but is not limited to, channel matrices and/or correlations thereof.

Thus, according to some example embodiments or modes or implementations, the different parts of the multi-part feedback signal can correspond to (e.g., have a one-to-one correspondence with) different matrices comprising the multi-part matrix structure. The multi-part matrix structure thus includes the constituent matrices. Moreover, the multi-part matrix structure may be configured in differing ways.

For example, according to some example embodiments or modes or implementations, the multi-part matrix structure can comprise a precoder matrix structure for a precoder which is derived from the channel state information. As a non-limiting example precoder implementation, at least one part of the multi-part matrix structure is part of or represents at least a portion of a codebook. In some such implementations the precoder matrix can be obtained as a Kronecker product of two matrices comprising the multi-part matrix structure, e.g., a Kronecker product of a polarization matrix and a beamforming vector. For example, the matrix utilized by the second device for transmission rank r and NT transmit antennas can be represented as a Kronecker product $W^{(r)} = W_{pol}^{(r)} \otimes w_{BF}$ wherein a 2×r polarization precoder matrix $W_{pol}^{(r)}$ adjusts the relative phases between two orthogonal polarizations while a $$\frac{N_T}{2} \times 1$$

beamforming vector $w_{BF}$ adjusts the relative phases within each of two groups of closely spaced co-polarized antennas.

As another example, according to some example embodiments or modes or implementations, the multi-part matrix structure comprises a channel correlation matrix. In some example channel correlation implementations, the channel correlation matrix comprises a block diagonal matrix and a first constituent matrix of the channel correlation matrix represents at least one block, and a second constituent matrix of the channel correlation matrix represents relative phases and amplitude of the blocks. Examples of the foregoing are provided and further explained below.

In the above regard, the person skilled in the art understands that when first device 28 sends a multi-part feedback signal 22 which includes precoder feedback (e.g., in the form of precoder matrices or at least portions of precoder codebook(s)), the first device 28 has determined a suitable transmission property for second device 30 for a hypothetical transmission, the precoder feedback being based on the channel properties. On the other hand, when the first device 28 sends a multi-part feedback signal 22 that is trying to represent the channel 32, the second device 30 is expected to exploit the reported channel state information for determining a suitable transmission property, e.g., precoder matrix(ices).

Figure 6:
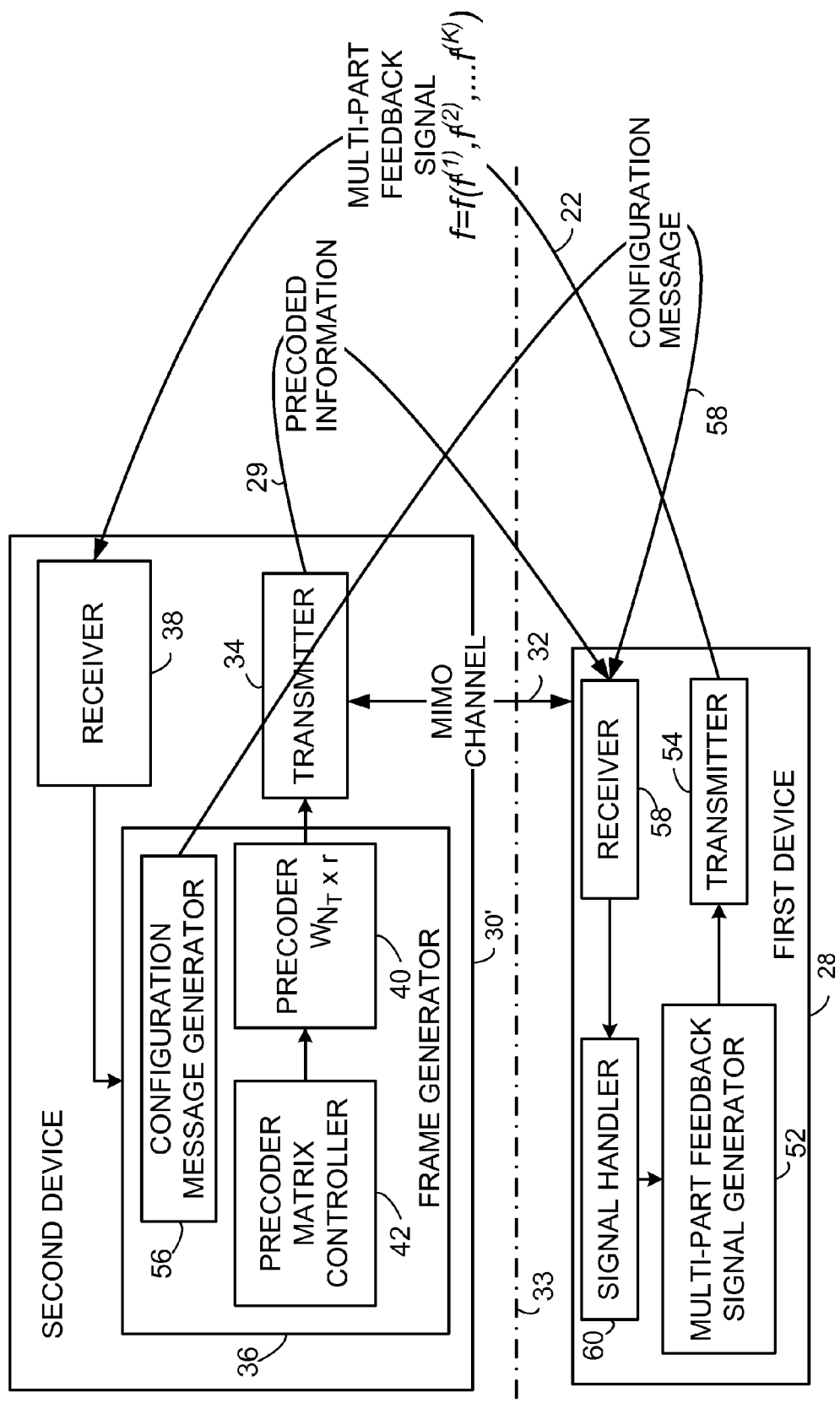
FIG. 6 is a schematic view of a communications system showing transmission of a multi-part feedback signal from a first device to a second device as well as transmission of a configuration message from the second device to the first device.

As shown in FIG. 4B, the feedback signaling part of the technology described herein can be formulated as introducing a feedback signal f which can be expressed as a function of two or more signal parts $f^{(1)}, f^{(2)}, \ldots, f^{(K)}$, i.e., $$f = f(f^{(1)}, f^{(2)}, \ldots, f^{(k)})$$

and where those signal parts can be conveyed over the feedback link with different granularities in time and/or frequency. In fact, in an example embodiment of second device 30 shown in FIG. 6 as comprising configuration message generator 56 the granularities may be configurable by second device 30 by sending a configuration message 58 to first device 28, e.g., $f^{(1)}$ configured to be updated every 80 ms in a wideband fashion, while $f^{(2)}$ configured to be updated every ten ms in a frequency-selective manner (e.g., every eighth resource block (RB) pair). This applies both to codebook based as well as non-codebook based precoded transmissions. FIG. 6 further shows that first device 28 comprises receiver 58 which receives, e.g., the configuration message 58, and which applies any signaling information received on the downlink to signal handler 60.

Figure 7B:
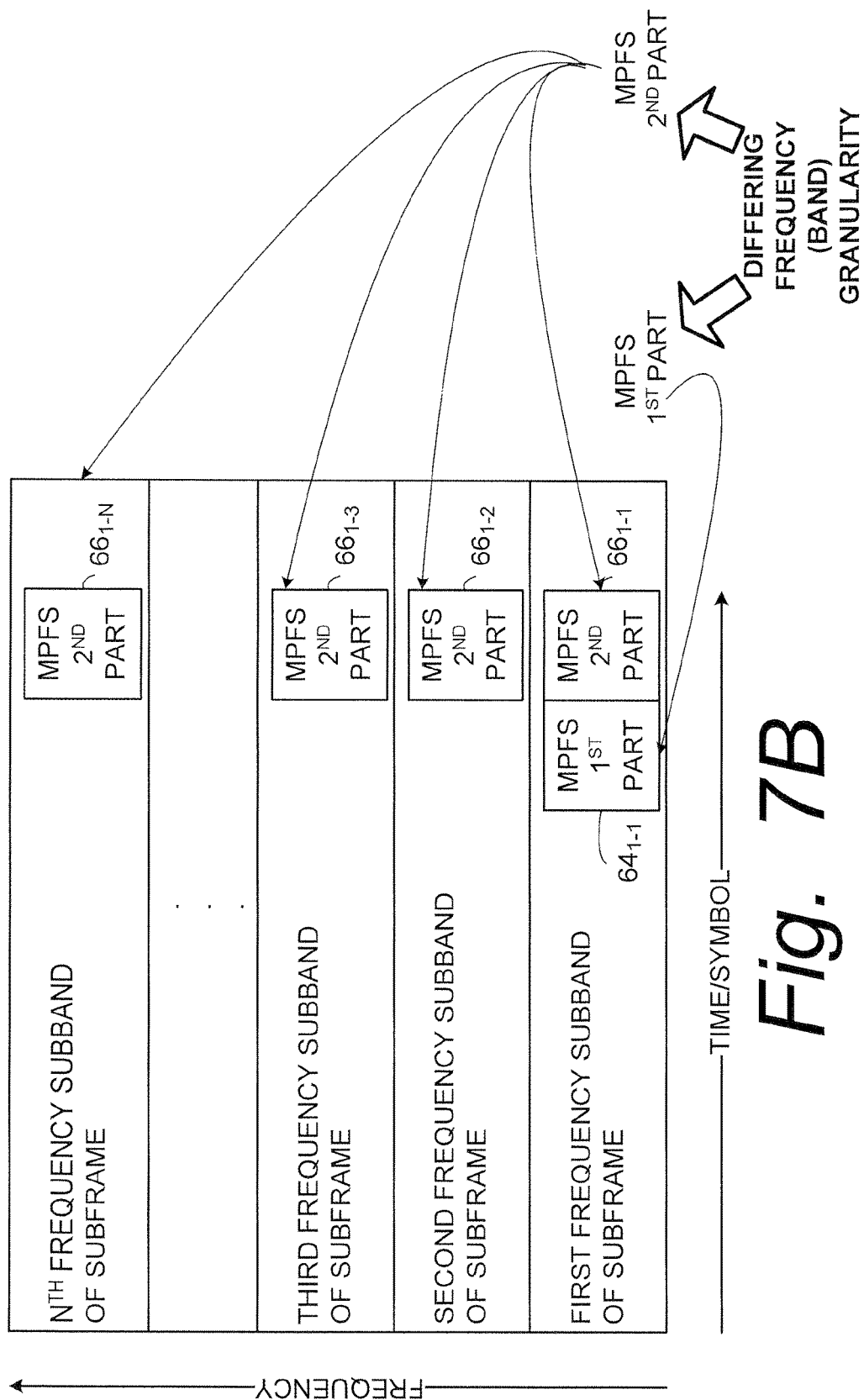
FIG. 7B is a diagrammatic view illustrating an example scenario of differing granularity of transmission of differing portions of the multi-part feedback signal with respect to with respect to frequency subbands.

FIG. 7A illustrates how different parts 64, 66 of the multi-part feedback signal 22 can be transmitted from first device 28 to second device 30 with the two respective different transmission granularities. FIG. 7A illustrates transmission of differing parts of multi-part feedback signal 22 with different time transmission granularities; FIG. 7B illustrates transmission of differing parts of multi-part feedback signal 22 with differing granularity with respect to frequency band. Both FIG. 7A and FIG. 7B are described by way of example with respect to Long Term Evolution (LTE) technology, wherein a subframe with 1 ms duration is transmitted over plural frequency subbands.

In the non-limiting example of FIG. 7A one part of the multi-part feedback signal 22 is transmitted every j*N subframes (where j and N are both integers and N>1), while the other part of the multi-part feedback signal 22 is transmitted every $j^{th}$ to subframe. FIG. 7A thus illustrates an example situation wherein j=1, and wherein information comprising a first part 64 of multi-part feedback signal 22 is transmitted every N subframes and information comprising a second part 66 of multi-part feedback signal 22 is transmitted every subframe. For example, assuming that a frame has N number of subframes, for a first subframe of a first frame the first part $64_{1-1}$ and the second part $66_{1-1}$ of the multi-part feedback signal 22 are transmitted at time $T_1$, but for subframes 1-2 through 1-N of the first frame only the second parts 66 of the multi-part feedback signal 22 are transmitted at respective times $T_2$ through $T_N$, respectively. Similarly, for a first subframe of a second frame the first part $64_{2-1}$ and the second part $66_{2-1}$ of the multi-part feedback signal 22 are transmitted at time $T_{N+1}$, but for subframes 2-2 through 2-N of the second frame only the second parts 66 of the multi-part feedback signal 22 are transmitted at respective times $T_{N+2}$ through $T_{2N}$, respectively. It should be understood that the integer N need not be chosen to equal the number of subframes per frame, although shown as such in the FIG. 7A illustration for convenience. In other situations, N can be chosen to be less than or greater than the number of subframes in a frame. Yet in at least some embodiments N equals 8 so that the first part 64 of multi-part feedback signal (MPFS) is scheduled (e.g., in accordance with configuration message 58) to be updated every 80 milliseconds in wideband fashion and the second part 66 of multi-part feedback signal (MPFS) is scheduled to be updated every 10 milliseconds in a frequency-selective manner.

In the non-limiting example of FIG. 7B one part of the multi-part feedback signal 22 is transmitted every h*N subbands (where h and N are both integers and N>1), while the other part of the multi-part feedback signal 22 is transmitted every $h^{th}$ subband. FIG. 7B illustrates an example situation wherein h=1, and wherein information comprising a first part 64 of multi-part feedback signal 22 is transmitted once every N subbands (e.g., in only one subband per subframe in the non-limiting illustration of FIG. 7B), and information comprising a second part 66 of multi-part feedback signal 22 is transmitted in every subband of a subframe. For example, assuming that a subframe has N number of subbands, the first part $64_{1-1}$ and the second part $66_{1-1}$ of the multi-part feedback signal 22 are transmitted for the first subband but for other subbands of the subframe only the second part 66 of the multi-part feedback signal 22 is transmitted. It should be understood that the integer N need not be chosen to equal the number of subbands per subframe, although shown as such in the FIG. 7B illustration for convenience. In other situations, N can be chosen to be less than or greater than the number of subbands in a subframe.

In an example mode and embodiment basically illustrated by FIG. 8, the differing parts of the multi-part feedback signal are used to affect respective portions of a codebook-based precoder matrix. For example, first part 64 of multi-part feedback signal 22 is shown as affecting a first portion 40(1) of the precoder matrix and second part 66 of multi-part feedback signal 22 is shown as affecting a second portion 40(2) of the precoder matrix.

Figure 9:
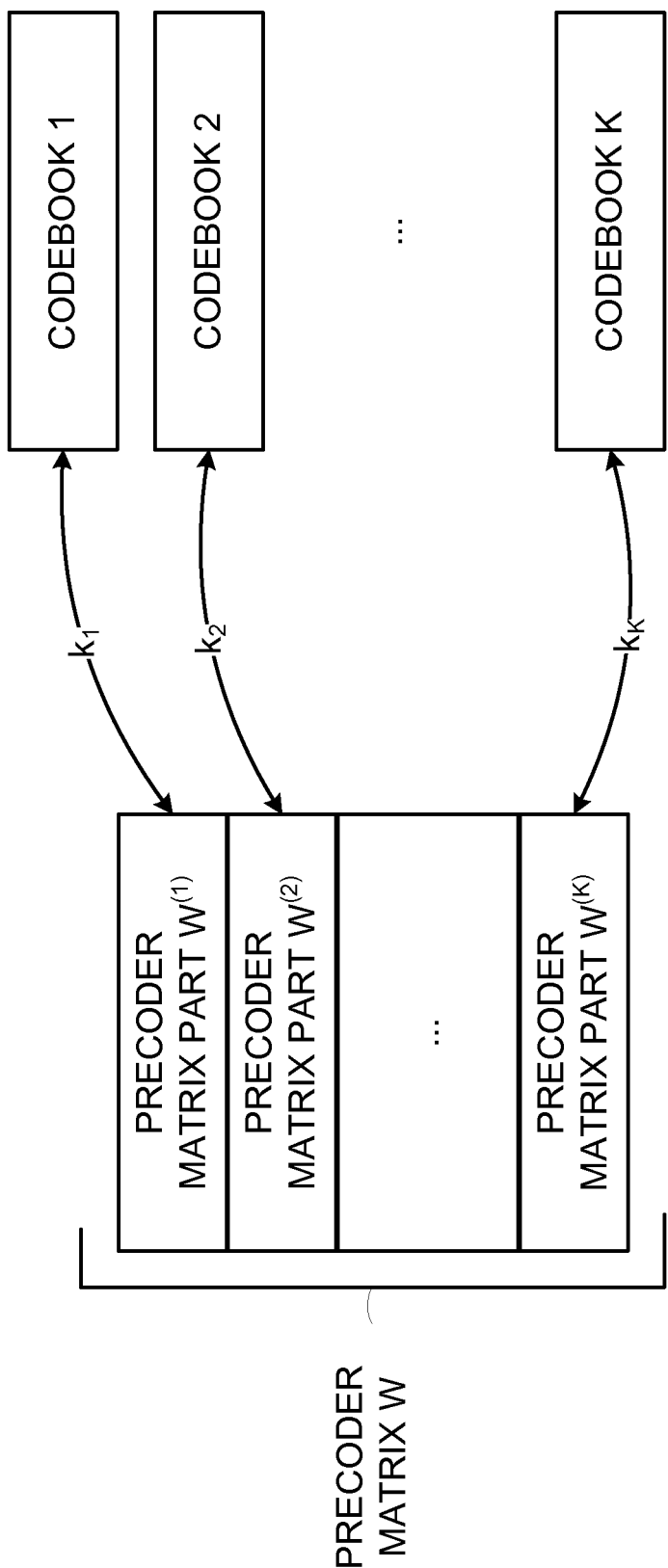
FIG. 9 is a diagrammatic view showing indices which provide values for various parts of a precoder.

In the above regard, for codebook based precoding, "f" actually corresponds to a precoder matrix enumerated by two or more precoder indices. Hence, the expression $f=f(f^{(1)}, f^{(2)}, \ldots, f^{(k)})$ can alternatively be written in the form:

$$W = W(W_{k_1}^{(1)}, W_{k_2}^{(2)}, \ldots, W_{k_K}^{(K)})$$

where $k_1, \ldots k_K$ are indices giving the values of the various parts of the precoder (see FIG. 9). In fact, these indices can be thought of as pointing out the matrix parts from smaller "codebooks". Again, these indices, or equivalent signals, may be configured to be reported with different time/frequency granularities The particular structure used needs to be carefully chosen in order to ensure benefits from the multi-granular reporting/signaling feature. Two non-limiting examples are now provided for four transmit and eight transmit antenna configurations for closely spaced cross-poles. For such a setup, precoders obeying a Kronecker structure are suitable. It gives the matrix of the tensor product with respect to a standard choice of basis. Hence, the precoder for transmission rank r and $N_T$ transmit antennas can be written as a Kronecker product $$W^{(r)} = W_{pol}^{(r)} \otimes w_{BF}$$

where a 2×r polarization precoder matrix $W_{pol}^{(r)}$ adjusts the relative phases between the two orthogonal polarizations while the $$\frac{N_T}{2} \times 1$$

beamforming vector $w_{BF}$ adjusts the relative phases within each of the two groups of closely spaced co-polarized antennas. For transmission rank 2, each layer/stream would then go on a separate polarization. The polarization precoder serves to increase array gain as well as strive towards orthogonalization of the channel that creates interference between the layers.

Figure 10:
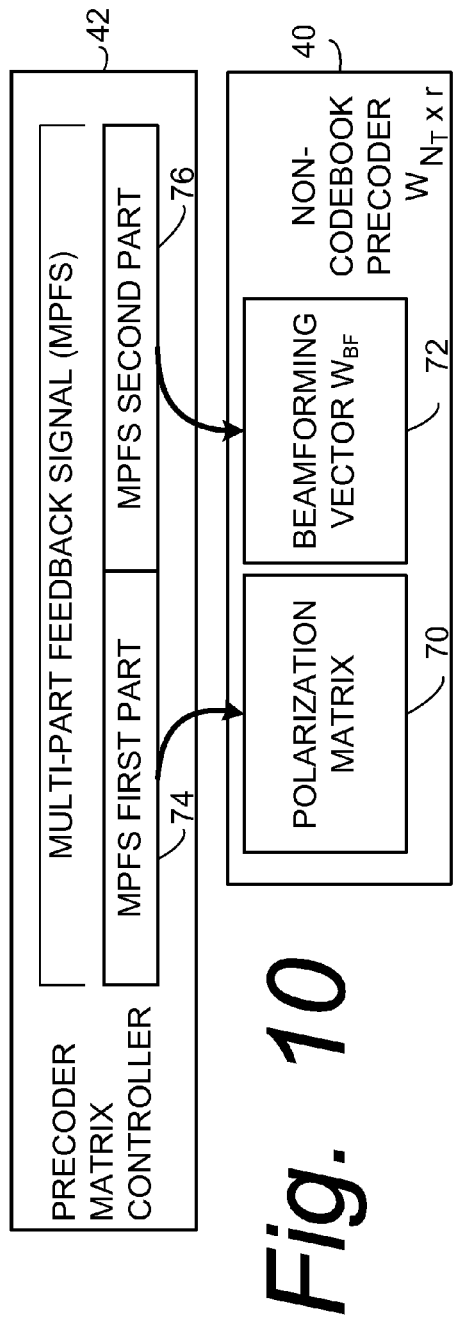
FIG. 10 is a diagrammatic view illustrating use of a multi-part feedback signal for affecting content of a polarization precoder matrix portion and a beamformer vector portion of a codebook-based precoder matrix.

FIG. 10 shows a situation in which the differing parts (e.g., first part 64 and second part 66) of multi-part feedback signal 22 do not refer to different portions or indices of a precoder as in codebook based feedback, but instead the differing parts of multi-part feedback signal 22 are more suited for other types of feedback such as non-codebook based feedback. In the situation shown in FIG. 10, the precoder 40 is shown as comprising polarization precoder matrix 70 and beamforming vector 72. In the FIG. 10 embodiment and mode, a first part 74 of the at least two differing parts of the multi-part feedback signal is used to affect polarization precoder matrix 70 of the precoder and a second part 76 of the at least two differing parts of the multi-part feedback signal is used to affect beamforming vector 72 of the precoder 40.

Figure 11:
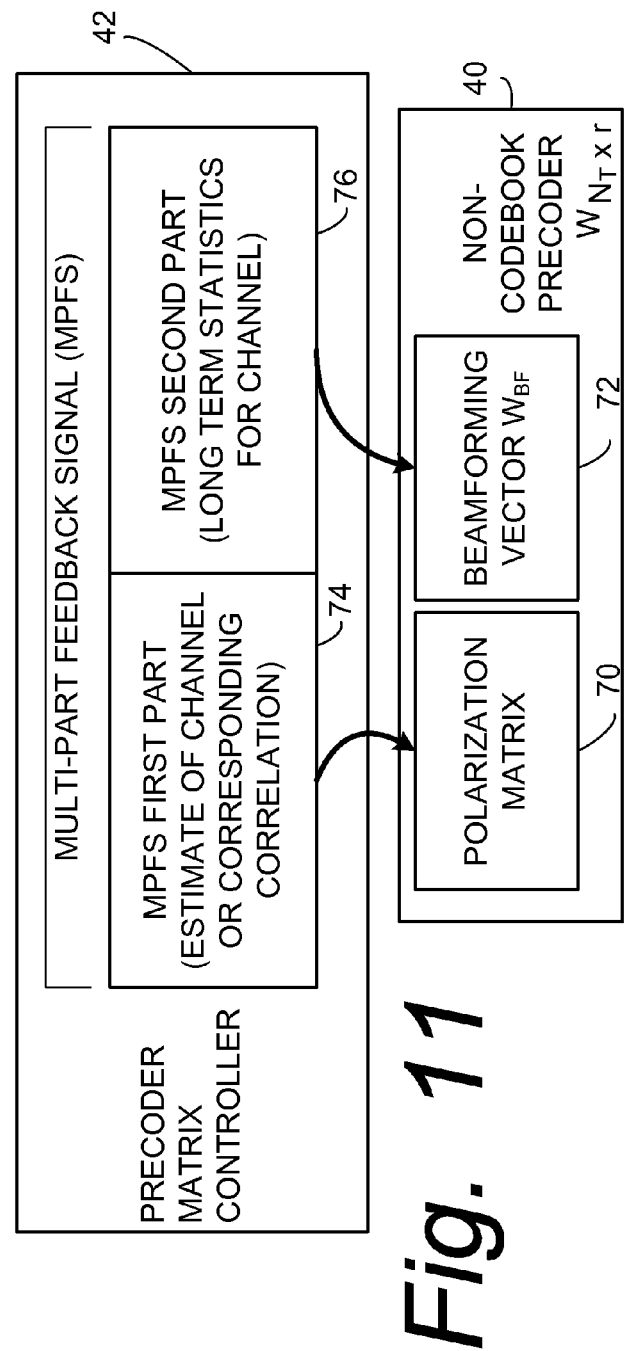
FIG. 11 is a diagrammatic view illustrating use of a channel estimating multi-part feedback signal for affecting content of a polarization precoder matrix portion and a beamformer vector portion of a non-codebook-based precoder matrix

As shown by way of example in FIG. 11, non-codebook based feedback could, for example, correspond to direct/explicit channel feedback where, instead of a precoder index, an estimate of the channel matrix could be fed back or a corresponding correlation thereof. In non-codebook based precoded transmissions, the beamforming vector $w_{BF}$ may be determined from long term correlation statistics of the channel. The long term statistics tend to be rather constant over frequency so it makes sense to only report wideband kind of information on a slow basis for its determination. On the other hand, the polarization precoder $W_{pol}^{(r)}$ relies on reporting with frequent updates both in the time and frequency domain since the channels corresponding to different polarization orientations tend to fade independently in a quick manner and vary in relative phase over bandwidth.

Figure 12:
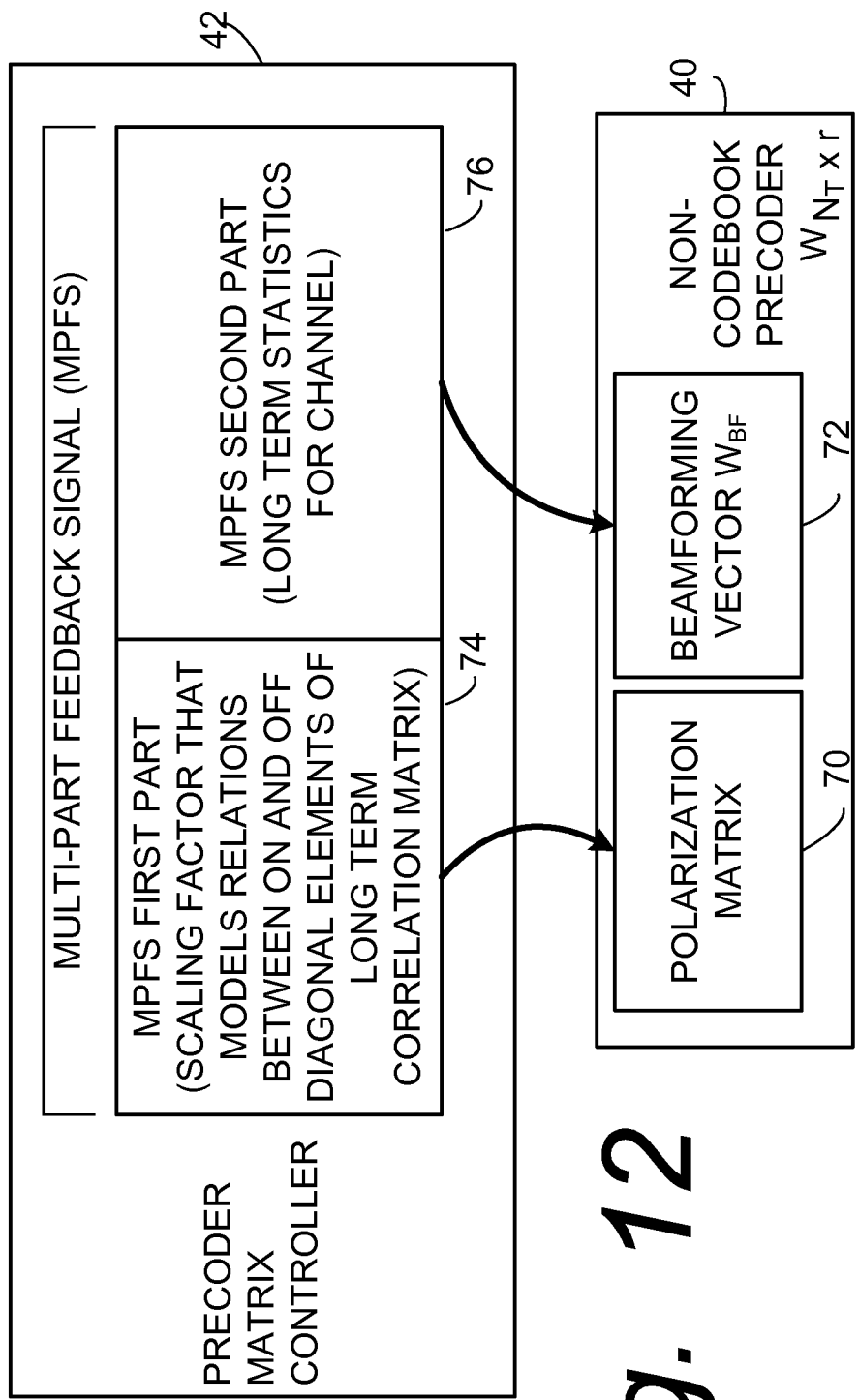
FIG. 12 is a diagrammatic view illustrating use of a multi-part feedback signal wherein relative phase and amplitude difference between two polarizations are captured by estimating the scaling factor under high correlation scenarios that models the relation between the on and off block diagonal elements.

Thus, feedback from first device 28 could (for example) correspond to reporting channel correlations for one or both of the groups of co-polarized antennas, or an average of the correlations of the two groups. This may correspond to reporting parts of the correlation matrix $$R_H = E[H^H H]$$

where the expectation operator may be replaced by a sample estimate taken over some frequencies and/or time depending on the configured granularity. Assuming the channels corresponding to the transmit antennas for each group are placed in consecutive columns in the channel matrix H, one, or both, or some average of both of the $$\frac{N_T}{2} \times \frac{N_T}{2}$$

blocks on the diagonal of $R_H$ would be reported. The relative phase and amplitude difference between the two polarizations may be captured by estimating the scaling factor under high correlation scenarios that models the relation between the on and off block diagonal elements. FIG. 12 shows such an implementation. The reporting granularity of this latter part typically needs to track the instantaneous channel but since this part is only one parameter (assuming transmission rank 1) considerable savings in signaling overhead are made compared with transmitted the entire correlation matrix with fine granularity.

In case of codebook based precoding feedback, the precoder matrix is decomposed into the Kronecker structure given above. As seen from $$W_{k,l}^{(r)} = W_{pol}^{(r)} \otimes w_{BF,k}$$

the indices k and l can be fed back with different granularity, where the former may in general be reported with a coarser time/frequency granularity than the latter.

The beamforming vectors may correspond to a grid of beams based on, e.g., potentially rotated DFT matrices, and could thus take the form $$[W_{DFT}]_{mn} = \exp\left(j\frac{2\pi}{N_{Tx,group}}m\frac{n}{Q}\right), m = 0, 1, \ldots, N_{Tx,group} - 1,$$

$$n = 0, 1, \ldots, QN_{Tx,group} - 1$$

$$[W_{rot}]_{mn} = \exp\left(j\frac{\pi}{QN_{Tx,group}}m\right)$$

$$w_{BF,k} = W_{rot} w_{DFT,k}, k = 0, 1, \ldots, QN_{Tx,group} - 1$$

where Q is an oversampling factor that is often set equal to 2 and $N_{Tx,group}$ represents the number of transmit antennas in the antenna group of interest.

The polarization precoder for rank 1 may take the form $$W_{pol,i}^{(1)} = \begin{bmatrix} 1 \\ \exp(j\theta_l) \end{bmatrix}, 0 \leq \theta_l < 2\pi$$

and for rank 2

$$W_{pol,l,l'}^{(2)} = \begin{bmatrix} \cos(\varphi_{l'}) & \sin(\varphi_{l'}) \\ \sin(\varphi_{l'})\exp(j\theta_l) & -\cos(\varphi_{l'})\exp(j\theta_l) \end{bmatrix}, 0 \leq \varphi_{l'} < \pi/2,$$

$$0 \leq \theta_l < \pi$$

The rank 2 polarization precoder is seen to be a (potentially scaled) unitary matrix parameterized in terms of φ and θ. A set of pairs of those parameters (corresponding to index l) may be chosen to design a codebook for the polarization precoder. For example, Rel-8 LTE provides support for two transmit rank two precoders comprising the elements $$\left\{ \frac{1}{\sqrt{2}}\begin{bmatrix} 1 & 1 \\ 1 & -1 \end{bmatrix}, \frac{1}{\sqrt{2}}\begin{bmatrix} 1 & 1 \\ j & -j \end{bmatrix} \right\}$$

These two precoders can equivalently be represented with $\phi_{l'}=\pi/4$, $\theta_l=0$ and $\phi_{l'}=\pi/4$, $\theta_l=j$, respectively. Since the polarization precoder only needs to cover two dimensions instead of all $2N_T$ real-valued degrees of freedom, fewer precoder matrices are needed for accurately representing the degrees of freedom than if all $2N_T$ dimensions were to be quantized. This is particularly important as the polarization precoder needs to be reported in a frequency-selective manner and thus greatly affects the total overhead.

This type of parameterization may also be used to differentially encode the signaling of multiple polarization precoders. Differentially encoding in the parameter domain instead of in the original precoder domain makes sense since maintaining the unitary property becomes straightforward and thus ensuring that precoder belongs to the Grassmanian manifold. This could be exploited for e.g., frequency-selective precoder reporting, or to capture the time variations of the polarization state.

For the above example of Kronecker precoder and codebook based precoder, the signaling of k and l may also be performed in the forward link and similarly as for the feedback reporting with different granularities, typically matching the granularities configured for the reporting. It is also possible to extend the number of layers in a straightforward manner by considering larger unitary polarization precoders. Naturally, the number of parameters describing the unitary matrix is then likely to increase.

Figure 13:
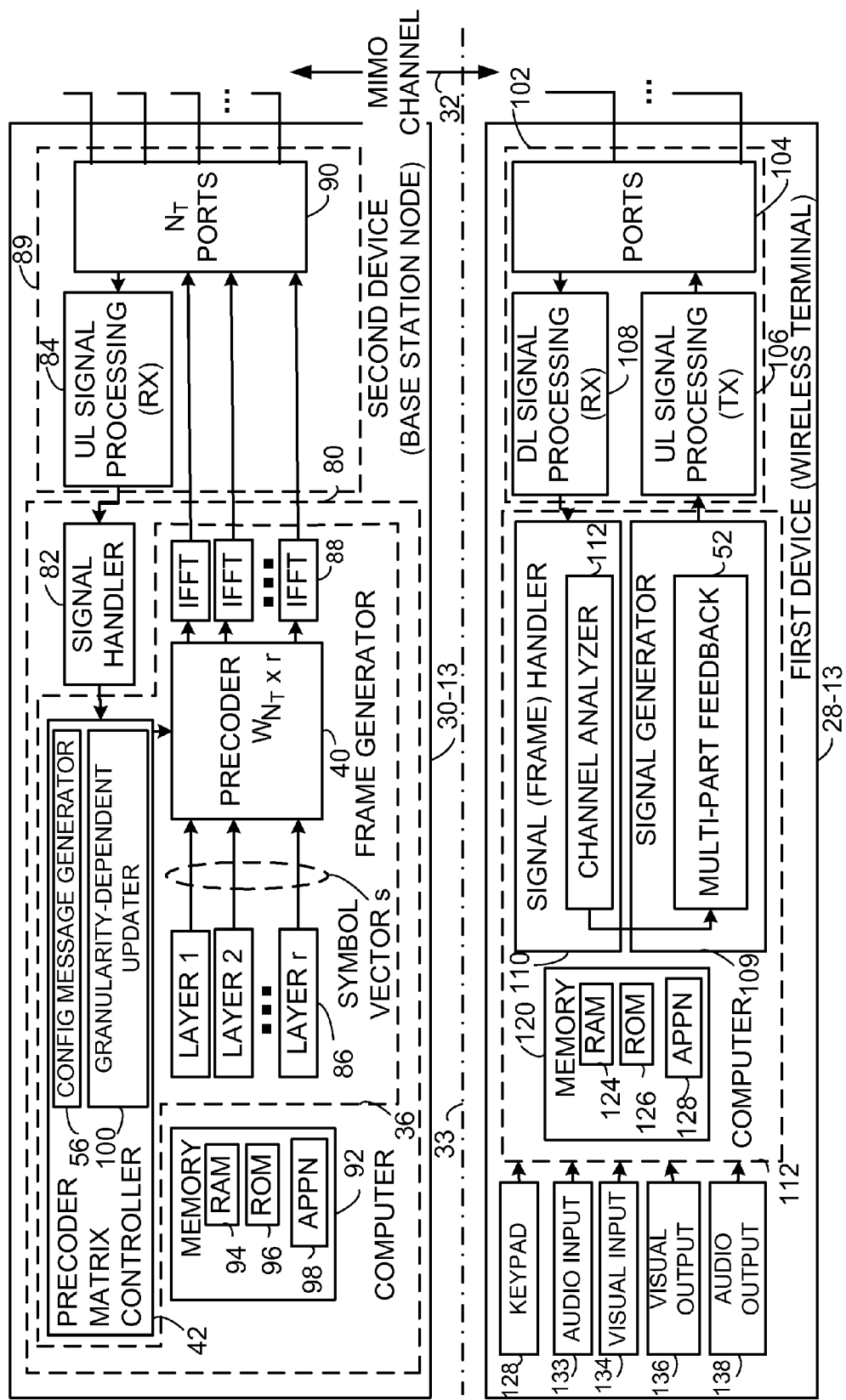
FIG. 13 is a schematic view of a communications system comprising a transmitting node/device comprising a precoder and a receiving node/device with a multi-part feedback signal generator.

FIG. 13 shows an example embodiment which illustrates how, with respect to one or both of second device 30 and first device 28, one or more of the foregoing embodiments and other embodiments encompassed hereby can be implemented using a computer (e.g., with processor or controller, as such terms are expansively elaborated herein). In particular, for second device 30-13 of the example embodiment of FIG. 13 the frame generator 36 with its precoder matrix controller 42 are realized by or implemented in a computer 80. In addition to comprising frame generator 36, the computer 80 also provides signal handling capability via signal handler 82. The signal handler 82 interprets and processes signals sent on the uplink from first device 28 to second device 30 over channel 32 after such uplink signals have been processed by uplink (UL) signal processor 84 (which also can be comprised by computer 80).

FIG. 13 further shows precoder 40 as receiving input signals from input signal layers 86, with the parallel output from input signal layers 86 forming the vector which is input to precoder 40. The output of precoder 40 is applied to inverse Fourier transform (IFFT) units 88. The outputs of the inverse Fourier transform (IFFT) units 88 are in turn applied to transmitter and receiver section 89. In an example embodiment the transmitter and receiver section 89 comprises the aforementioned transmitter 34 and receiver 38, as well as uplink (UL) signal processor 84 and antenna ports 90. The outputs of the inverse Fourier transform (IFFT) units 88 are applied to respective input terminals antenna ports 90. Output terminals of antenna ports 90 are connected to uplink (UL) signal processor 84.

The computer 80 which comprises frame generator 36 further includes memory 92. The memory 92 can comprise differing forms of memory, such as random access memory (RAM) 94; read-only memory 96; and program memory 98 (in which executable application programs or the like can be stored).

FIG. 13 further shows. precoder matrix controller 42 as comprising granularity-dependent updater 100. The granularity-dependent updater 100 can function to update precoder 40, e.g., in any of the manners of the differing embodiments described herein, including but not limited to the embodiments of FIG. PC, FIG. 8, FIG. 10, FIG. 11, and FIG. 12.

FIG. 13 also shows first device 28-13 as comprising transmitting and receiving section 102 which encompasses the aforementioned transmitter 54 and configuration message generator 56. The positioning reference signal detector 102 comprises antenna ports 104 having input terminals connected to uplink signal processing section 106 and output terminals connected to downlink signal processing section 108.

As also shown in FIG. 13, signal generator 109 of first device 28 as well as downlink signal handler 110 is comprised of or implemented by computer 112. The downlink signal handler 110 in turn comprises channel analyzer 114. The channel analyzer 114 is connected to multi-part feedback signal generator 52 portion of signal generator 109.

The computer 112 which comprises first device 28 further includes memory 120. The memory 120 can comprise differing forms of memory, such as random access memory (RAM) 124; read-only memory 126; and program memory 128 (in which executable application programs or the like can be stored). Certain representative input/output units for first device 28 are illustrated as being keypad 130; audio input device (e.g. microphone) 132; visual input device (e.g., camera) 134; visual output device (e.g., display 136); and audio output device (e.g., speaker) 138.

In other embodiments aspects of the technology disclosed herein concerning generation and use of the multi-part feedback signal can be implemented in hardware, such as by hardware circuit including but not limited to an application specific integrated circuit (ASIC).

The technology described in this application can advantageously reduce signaling overhead yet maintains good performance and limits computational complexity by avoiding signaling spatial properties for the entire channel with the fine granularity dictated by the most demanding component of the channel property. In particular, the technology includes in some embodiments using a Kronecker structure where the two different parts are reported or signaled with different granularities in combination with clustered array setups where groups of antennas are closely spaced and exhibit high correlation while the correlation between the groups tends to be low, either through different polarizations or large spacing between the groups. In case of codebook based precoding, a parameterized representation of the unitary polarization precoder may be used facilitating differential encoding of the precoder thereby reducing signaling overhead.

In an example implementation wherein the radio interface is a channel having an influence described by a channel matrix, and wherein the multi-part feedback signal comprises an estimate or correlation of the channel matrix, the method further comprises the second device using the first part of the multi-part feedback signal as corresponding to a scaling factor that models relations between on and off-diagonal sub-matrices of a channel correction matrix for affecting a polarization precoder matrix of the precoder and the second device using the second part of the multi-part feedback signal as corresponding to long term correlation statistics of the channel for affecting a beamforming vector of the precoder.

Although terminology from 3GPP LTE has been used herein merely as an illustration, this is not limiting to the scope of the technology described here. Other wireless systems, including WCDMA, WiMAX, UMB and GSM, may also benefit from exploiting the technology disclosed herein.

Terminology utilized herein is not to be interpreted restrictively. For example, as used herein, the term "downlink" can also encompass forward link and the term "uplink" can also encompass reverse link.

Terminology such as base station and wireless terminal or wireless terminal (UE) should be considering non-limiting and does not imply a certain hierarchical relation between the two. In general, "base station" could be considered as a first device and the wireless terminal could be considered a second device, and these two devices communicate with each other over some radio channel. As previously explained, both the first device and the second device can be wireless terminals. In any embodiment a wireless terminal can be a mobile station or user equipment unit (UE) such as a mobile telephone ("cellular" telephones) and a laptop with wireless capability), e.g., mobile termination), and thus can be, for example, portable, pocket, hand-held, computer-included, or car-mounted mobile devices which communicate voice and/or data with radio access network.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a first device arranged to report feedback information to a second device to affect content of a precoder matrix which is used by the second device in precoding information which is carried over a multiple-input, multiple output (MIMO) channel to the first device, the method comprising:
   generating a multi-part feedback signal representing a multi-part precoder matrix structure which is related to channel state information for the MIMO channel;
   transmitting to the second device over an uplink channel at least two different parts of the multi-part feedback signal with two respective different transmission granularities in time and frequency, the two different parts of the multi-part feedback signal each being a matrix or a vector, wherein both different parts of the multi-part feedback signal are transmitted at some times and frequencies but only one part of the multi-part feedback signal is transmitted at other times and frequencies; and
   wherein a first part of the two different parts of the multi-part feedback signal affects a polarization matrix and a second part of the two different parts of the multi-part feedback signal affects a beamforming vector of the precoder matrix.

2. The method of claim 1, further comprising receiving from the second device a feedback format command configured to specify the respective different transmission granularities.

3. A method of operating a communications network comprising a first device and a second device, the method comprising:
   transmitting information that has been precoded at the second device over a multiple input, multiple output (MIMO) channel to the first device;
   at the first device, generating a multi-part feedback signal representing a multi-part precoder matrix structure which is related to channel state information for the MIMO channel;
   the first device transmitting over an uplink channel to the second device at least two different parts of the multi-part feedback signal with two respective different transmission granularities in time and frequency, the two different parts of the multi-part feedback signal each being a matrix or a vector, wherein both different parts of the multi-part feedback signal are transmitted by the first device at some times and frequencies but only one part of the multi-part feedback signal is transmitted by the first device at other times and frequencies; and
   using the multi-part feedback signal at the second device to affect content of a precoder matrix which is used for precoding of information transmitted over the MIMO channel to the first device,
   wherein a first part of the two different parts of the multi-part feedback signal affects a polarization matrix and a second part of the two different parts of the multi-part feedback signal affects a beamforming vector of the precoder matrix.

4. The method of claim 3, further comprising the second device sending to the first device a feedback format command configured to specify the respective different transmission granularities.

5. A method of operating a communications node, the method comprising:
   using a precoder comprising a precoding matrix to transform information that is transmitted over a multiple-input, multiple output (MIMO) channel to a recipient device which receives the transformed information;
   receiving a multi-part feedback signal over an uplink channel from the recipient device, the feedback signal representing a multi-part precoder matrix structure related to channel state information for the MIMO channel, at least two different parts of the multi-part feedback signal being received with two respective different transmission granularities in time and frequency, the two different parts of the multi-part feedback signal each being a matrix or a vector, wherein both different parts of the multi-part feedback signal are received at some times and frequencies but only one part of the multi-part feedback signal is received at other times and frequencies; and
   using the multi-part feedback signal at the second device to affect precoding of further information transmitted over the MIMO channel to the recipient device,
   wherein a first part of the two different parts of the multi-part feedback signal affects a polarization matrix and a second part of the two different parts of the multi-part feedback signal affects a beamforming vector of the precoder matrix.

6. The method of claim 5, further comprising sending a feedback format command to the recipient device, the format command being configured to specify the respective different transmission granularities.

7. The method of claim 1, claim 3, or claim 5, wherein the precoder matrix structure is obtained as a Kronecker product of two matrices comprising the multi-part matrix structure.

8. The method of claim 1, claim 3, or claim 5,
   wherein the precoder matrix structure comprises the polarization matrix and the beamforming vector, and wherein the matrix for transmission rank r and $N_T$ transmit antennas is represented as a Kronecker product $W^{(r)} = W^{(r)}_{pol}(x) w_{BF}$ in which $2 \times r$ polarization precoder matrix $W^{(r)}_{pol}$ adjusts relative phases between two groups of antennas and $$\frac{N_r}{2} \times 1a$$

beamforming vector $w_{BF}$ adjusts the relative phases within each of two groups of antennas.

9. A first device configured to report feedback information over an uplink channel to a second device using a multi-part feedback signal representing a multi-part precoder matrix structure which is related to channel state information for a multiple-input, multiple output (MIMO) channel with at least two different parts of the multi-part feedback signal being transmitted to the second device with two respective different transmission granularities in time and frequency, the two different parts of the multi-part feedback signal each being a matrix or a vector, wherein both different parts of the multi-part feedback signal are transmitted at some times and frequencies but only one part of the multi-part feedback signal is transmitted at other times and frequencies; and
   wherein a first part of the two different parts of the multi-part feedback signal affects a polarization matrix and a second part of the two different parts of the multi-part feedback signal affects a beamforming vector of the precoder matrix.

10. The apparatus of claim 9, wherein the first device comprises:
    a receiver configured to receive information that has been precoded at the second device prior to transmission from the second device over the channel to the first device;

a generator configured to generate the multi-part feedback signal; and a transmitter configured to transmit to the second device the at least two different parts of the multi-part feedback signal with the two respective different transmission granularities in time and frequency.

11. The apparatus of claim 10, wherein the receiver is further configured to receive from the second device a feedback format command configured to specify the respective different transmission granularities.

12. A communications network comprising:

a first device configured to report feedback information over an uplink channel to a second device using a multi-part feedback signal representing a multi-part precoder matrix structure which is related to channel state information for a multiple-input, multiple output (MIMO) channel, with at least two different parts of the multi-part feedback signal being transmitted to the second device with two respective different transmission granularities in time and frequency, the two different parts of the multi-part feedback signal each being a matrix or a vector, wherein both different parts of the multi-part feedback signal are transmitted at some times and frequencies but only one part of the multi-part feedback signal is transmitted at other times and frequencies; and the second device comprising a precoder and configured to use the multi-part feedback signal to affect precoding by a precoder of further information transmitted over the MIMO channel to the first device, wherein a first part of the two different parts of the multi-part feedback signal affects a polarization matrix and a second part of the two different parts of the multi-part feedback signal affects a beamforming vector of the precoder matrix.

13. The apparatus of claim 12, wherein the precoder of the second device is configured to transform information that is to be transmitted to the second device, wherein the second device comprises a second device transmitter configured to transmit precoded information over the MIMO channel to the first device, wherein the first device comprises:

a receiver configured to receive the precoded information over the MIMO channel from the first device;

a generator configured to generate the multi-part feedback signal; and a first device transmitter which transmits to the second device the at least two different parts of the multi-part feedback signal with the two respective different transmission granularities in time and frequency, and wherein the second device further comprises a precoder controller configured to use the multi-part feedback signal to affect precoding of the further information transmitted over the MIMO channel to the first device.

14. A communications node configured to receive a multi-part feedback signal over an uplink channel from a recipient device, the feedback signal representing a multi-part precoder matrix structure related to channel state information for a multiple-input, multiple output (MIMO) channel over which the communications node transmits precoded information to the recipient device, at least two different parts of the multi-part feedback signal being received with two respective different transmission granularities in time and frequency, the two different parts of the multi-part feedback signal each being a matrix or a vector, wherein both different parts of the multi-part feedback signal are received at some times and frequencies but only one part of the multi-part feedback signal is received at other times and frequencies;

wherein the communications node comprises a precoder and is configured to use the multi-part feedback signal to affect precoding of further information transmitted over the MIMO channel to the recipient device, and wherein a first part of the two different parts of the multi-part feedback signal affects a polarization matrix and a second part of the two different parts of the multi-part feedback signal affects a beamforming vector of the precoder matrix.

15. The apparatus of claim 14, wherein the precoder is configured to transform information that is transmitted over the MIMO channel to the recipient device, and wherein the communications node further comprises:

a receiver configured to receive the multi-part feedback signal; and a precoder controller configured to use the multi-part feedback signal at the communications node to affect precoding of the further information transmitted over the MIMO channel to the recipient device.

16. The apparatus of claim 9, claim 12, or claim 14, wherein the feedback signal comprises a Kronecker product of two matrices comprising the multi-part precoder matrix structure.

17. The apparatus of claim 9, claim 12, or claim 14, wherein the precoder matrix structure comprises the polarization matrix and the beamforming vector, and wherein the matrix for transmission rank r and $N_T$ transmit antennas is represented as a Kronecker product $W^{(r)} = W^{(r)}_{pol}(x) w_{BF}$ in which $2 \times r$ polarization precoder matrix $W^{(r)}_{pol}$ adjusts relative phases between two groups of antennas and $$\frac{N_r}{2} \times 1 a$$

beamforming vector $w_{BF}$ adjusts the relative phases within each of two groups of antennas.

18. The apparatus of claim 15, wherein the precoder controller is further configured to generate a feedback format command to the recipient device, the format command being configured to specify the respective different transmission granularities.

19. A method in a first device arranged to report feedback information to a second device to affect content of a precoder matrix which is used by the second device in precoding information which is carried over a multiple-input, multiple output (MIMO) channel to the first device, the method comprising:

generating a multi-part feedback signal representing a multi-part precoder matrix structure which is related to channel state information for the MIMO channel;

transmitting over an uplink channel to the second device at least two different parts of the multi-part feedback signal with two respective different transmission granularities in time and/or frequency, the two different parts of the multi-part feedback signal each being a matrix or a vector, wherein both different parts of the multi-part feedback signal are transmitted at some times and frequencies but only one part of the multi-part feedback signal is transmitted at other times and frequencies; and wherein a first part of the two different parts of the multi-part feedback signal affects a polarization matrix and a second part of the two different parts of the multi-part feedback signal affects a beamforming vector of the precoder matrix.

* * * * *